United States Patent [19]

Strolle et al.

[11] 4,434,437

[45] Feb. 28, 1984

[54] GENERATING ANGULAR COORDINATE OF RASTER SCAN OF POLAR-COORDINATE ADDRESSED MEMORY

[75] Inventors: Christopher H. Strolle, Philadelphia, Pa.; Terrence R. Smith, Clementon, N.J.

[73] Assignee: RCA Corporation, New York, N.Y.

[21] Appl. No.: 298,269

[22] Filed: Aug. 31, 1981

[30] Foreign Application Priority Data

Jan. 26, 1981 [GB] United Kingdom .................. 8102281

[51] Int. Cl.³ ............................................... H04N 5/02
[52] U.S. Cl. .................................... 358/140; 360/33.1; 343/6 TV; 343/5 SC; 364/731; 364/815
[58] Field of Search ................. 358/140; 340/727, 728; 343/6 TV, 5 SC; 360/9.1, 33.1; 364/731, 815

[56] References Cited

U.S. PATENT DOCUMENTS

| | | | |
|---|---|---|---|
| 3,836,812 | 9/1974 | Bennett | 315/18 |
| 4,065,770 | 12/1977 | Berry | 343/5 SC |
| 4,220,969 | 9/1980 | Nitadori | 358/140 |
| 4,275,415 | 6/1981 | Engle | 358/140 |
| 4,283,736 | 8/1981 | Morio et al. | 358/140 |
| 4,310,853 | 1/1982 | Madson | 358/140 |

OTHER PUBLICATIONS

Digital Video, vol. 3, edited by Richard Marcus, pp. 89–98.

*Primary Examiner*—John C. Martin
*Assistant Examiner*—Edward L. Coles
*Attorney, Agent, or Firm*—Joseph S. Tripoli; George E. Haas; Allen LeRoy Limberg

[57] ABSTRACT

Graphics for television display which emphasize circles, ellipses, circular or elliptical arcs, and the radii of circles or ellipses are conveniently stored in image memories addressable in polar coordinates. Television images which are to be rotated are conveniently stored in such memories, so the angular coordinate of the image memory addresses can be incremented or decremented to rotate the image with hardware as simple as a single adder. To read image memories addressed in polar coordinates, the Cartesian coordinates descriptive of television raster display are scan-converted to polar coordinates. This scan conversion takes place in real time at video sampling rates. The generation of the angular coordinate of the polar coordinates is facilitated by dividing one Cartesian coordinate by another by differentially combining their logarithms as found from read-only-memory table look-up, then finding an arc tangent from the logarithm of their difference as found from further read-only-memory table look-up. Since the non-linearities of the logarithm and arc tangent functions tend to track each other to a degree, combining the anti-logarithm and arc tangent look-up steps in a single read-only memory provides greater angular resolution for number of bits used in the read-only-memory input addresses.

10 Claims, 5 Drawing Figures

GENERATING ANGULAR COORDINATE OF RASTER SCAN OF POLAR-COORDINATE ADDRESSED MEMORY

FIELD OF THE INVENTION

The present invention relates to digital calculation using read-only memory (ROM) for table look-up of non-linear functions of variables and, more particularly, to the reduction of the size of ROM required for given number of places of resolution in the look-up function.

BACKGROUND OF THE INVENTION

An example of such digital calculation occurs in the calculation of the angular coordinate in a scan conversion from Cartesian to polar coordinates, as may be done for addressing television graphic display memory organized to be addressed in polar coordinates. The Cartesian coordinates x and y are directed from left to right and from top to bottom of screen, respectively, in the left-hand coordinate system customarily employed by television engineers; and it is convenient to choose the origin at the center of screen supposing the display memory is to cover the entire television screen. In any case, for the purposes of convenient scan conversion, the origins of the Cartesian-coordinate and polar-coordinate systems should preferably coincide at a point in image space. Radial polar coordinate r is measured outward from this point, and angular polar coordinate $\theta$ is measured turning about this point counterclockwise from positive half of x axis, in keeping with the use of left-hand coordinates.

The angular coordinate $\theta$ could be looked up from ROM responsive to x and y. Supposing the display to comprise 512 lines with 512 picture elements (or "pixels", for short) per line, then a quadrant of $\theta$ could be looked up from ROM using eight bits of x and eight bits of y as input. About fourteen bits of output are required to define $\theta$ with the resolution found by experiment to be required for extracting graphic images from display memory addressed in polar coordinates. The nine most significant bits of this angular coordinate are used together with eight bits of radial coordinate as input to a ROM storing a graphic image that fills the display screen, and five next most significant bits of this angular coordinate are used in two-dimensional interpolation between video samples from spatially adjacent locations in the ROM. This interpolation is done to avoid visible discontinuities in edges of the graphic image as it appears on the display screen. About sixty-four ROM's of the conventional size with eleven-bit imputs and eight-bit outputs would be required for such direct look-up of $\theta$.

The angular coordinate $\theta$ could be calculated by first dividing y and x and then using a ROM to look up $\tan^{-1}(y/x)$. Several division calculations must be carried on simultaneously to supply results at pixel scan rate unless one divides using ROM, which would require a ROM the size of that to look up directly from x and y. The size of the ROM required to look up $\tan^{-1}(y/x)$ has to be large enough to define y/x with enough bits to resolve the difference between 1/255 and 1/254 at one end of its range and between 254 and 255 at the other end of its range. This must require in excess of nine bits of input to memory, eight bits being required to define possible y values divided by x of unity and another bit to define their reciprocals, which values y/x would define the boundaries of quadrant defined by the lines x=255 and y=255 with the same resolution as pixels are defined on the display screen. Additional resolution in input to arc tangent table look-up ROM is certainly required to avoid spatial quantization effects at edges of the graphic image displayed on screen because some of the values of y/x will fall between those associated with those points on the boundary lines x=255, y=255.

Substantial still further resolution in input to arc tangent table look-up ROM is required because the non-linearity of the arc tangent function with respect to its argument is very marked as the argument becomes large. Manyfold increase in y/x causes only gradual increase in $\tan^{-1}(y/x)$. So excessive capability to resolve in this region reduces the number of bits available in y/x to resolve its arc tangent when (y/x) is small, and the number of bits of (y/x) to resolve $\theta$ adequately throughout the range of y/x must be increased.

The inventors have found that substantially less ROM is required if one looks up $\theta$ in ROM responsive to $\log_2(y/x)$ input as the $\tan^{-1}\{\text{anti-log}[\log_2(y/x)]\}$. This is because $\theta$ is more linear respective to $\log_2(y/x)$ than to y/x, so that adequate resolution in $\theta$ can be obtained through the full range of $\log_2 y/x$ with fewer bits than through the full range of y/x.

More generally, if one has to look up a monotonically non-linear function of a variable from ROM, the number of bits required in the ROM input to adequately resolve the function across its whole range can be reduced if the variable is expressed in logarithmic terms. Where the monotonically non-linear function grows progressively more rapidly as the variable increases, then the more common form of logarithm, which increases as argument increases, is used. Where the monotonically non-linear function grows progressively less rapidly as the variable increases a form of logarithm which decreases as argument increase (e.g., as originally described by Napier) can be used.

This approach is particularly useful where the variable used as input to the ROM is the result of a calculation more easily carried forward in the logarithmic domain than in the linear domain. Digital division, such as that of y by x, is an example of such calculation. This can be done by subtracting the logarithm of x as obtained by table look-up from ROM from the logarithm of y as obtained by table look-up from ROM, which table look-ups can be performed sequentially from the same ROM. Or this can be done by adding the logarithm of y as obtained by table look-up from a ROM responsive to y input and the logarithm of 1/x as obtained by table look-up from a ROM responsive to x input. Types of calculation, besides digital division, that are more easily carried forward in the logarithmic domain than in the arithmetic include digital multiplication, certain power-taking and root-taking processes, and combinations of these operations.

SUMMARY OF THE INVENTION

The present invention is embodied in Cartesian-coordinate to polar-coordinate scan conversion apparatus in real time at pixel scan rate. The angular polar coordinate is calculated from the arc tangent of the antilogarithm of the combined logarithms of the magnitudes of the Cartesian coordinates, with provision being made to circumvent division-by-zero problems.

DETAILED DESCRIPTION

Figure 1:
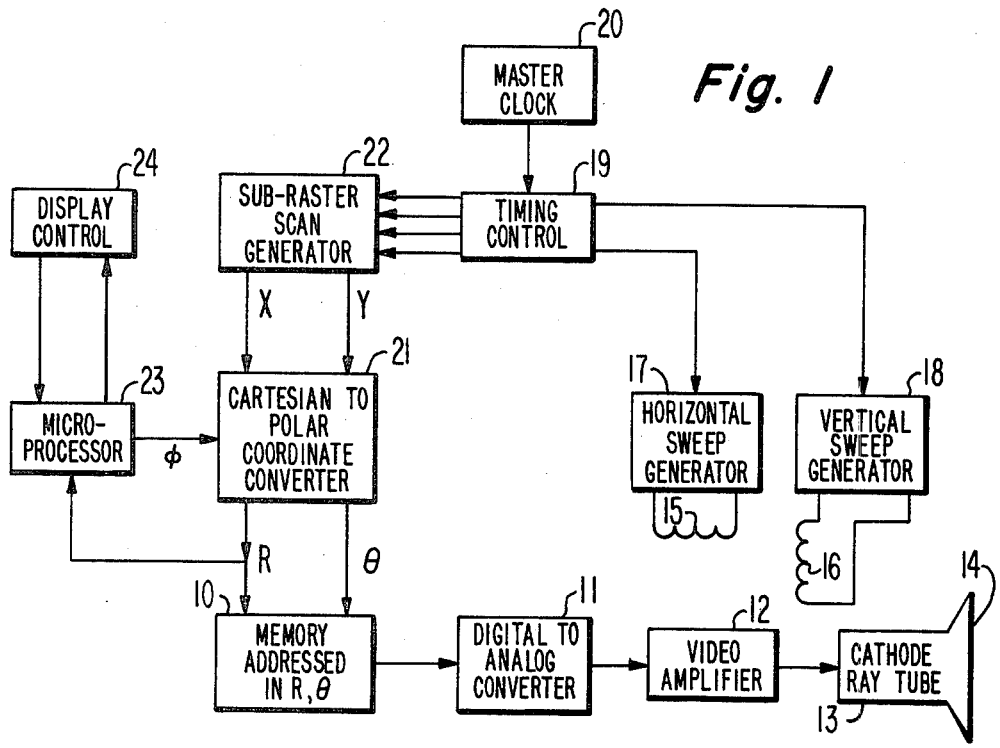
FIG. 1 is a block diagram of a television display system for displaying an image taken from memory and rotated through a programmable angle in which apparatus the invention finds use.

In FIG. 1 display memory 10 stores information read out at video rates to the input of digital-to-analog converter (DAC) 11 to be converted to video for application to a video amplifier 12, the output of which drives the electron gun of a cathode ray tube (CRT) 13. CRT 13 has a screen 14 raster-scanned by the electron beam emanating from its electron gun. The raster-scanning is typically accomplished using horizontal and vertical deflection coils 15 and 16 supplied sawtooth currents from horizontal and vertical sweep generators 17 and 18, respectively. It is customary to use resonant circuits including the deflection coils in these generators and to synchronize the sweeps with horizontal and vertical synchronizing pulses supplied by timing control circuitry 19. Circuitry 19 generally includes frequency-dividing circuitry for generating these synchronizing pulses at rates subharmonic to master clock signals provided from a master clock 20, which customarily comprises a crystal oscillator which operates at the pixel scan rate or a multiple thereof.

Memory 10 is addressed during its readout by the integral portions of radial and angular coordinates r and $\theta$, respectively, supplied as output from a scan converter 21 responsive to x and y coordinates supplied to it as input from a scan generator 22. Scan generator 22 generates a sub-raster—i.e., a raster scanning of x and y addresses which may or may not be co-extensive with the raster scanning of the display screen by electron beam. These x and y coordinates are generated by scan generator 22 at pixel scan rate during each line scan of CRT 13 screen 14 in the trace direction, as timed from timing control circuitry 19. Scan converter 21 is programmable as to the degree of rotation (expressed as angle $\phi$) of the image to be read out of display memory 10. This angle $\phi$ is added to the angular $\psi$ coordinates descriptive of unrotated image to obtain the angular $\theta$ coordinates descriptive of rotated graphic image. That is, in the system being described $\tan^{-1}(y/x)$ defines $\psi$, rather than $\theta$, with $\theta$ being defined as equalling $\psi$ plus the angle $\phi$ by which the image is rotated between memory 10 and its display on screen 14 of CRT 13. The angle $\phi$ may, for example, be calculated by a microprocessor 23, responsive to data received or interchanged with display control circuitry 24. The display control circuitry 24 might, for example, comprise the gyroscopic compass, synchros and synchro-to-digital converters in a horizontal situation indicator system for aircraft cockpit use. Microprocessor 23 may also use radial coordinate r output from scan converter 21 in its calculations where concentric images are to be rotated in differing degrees.

Figure 2:
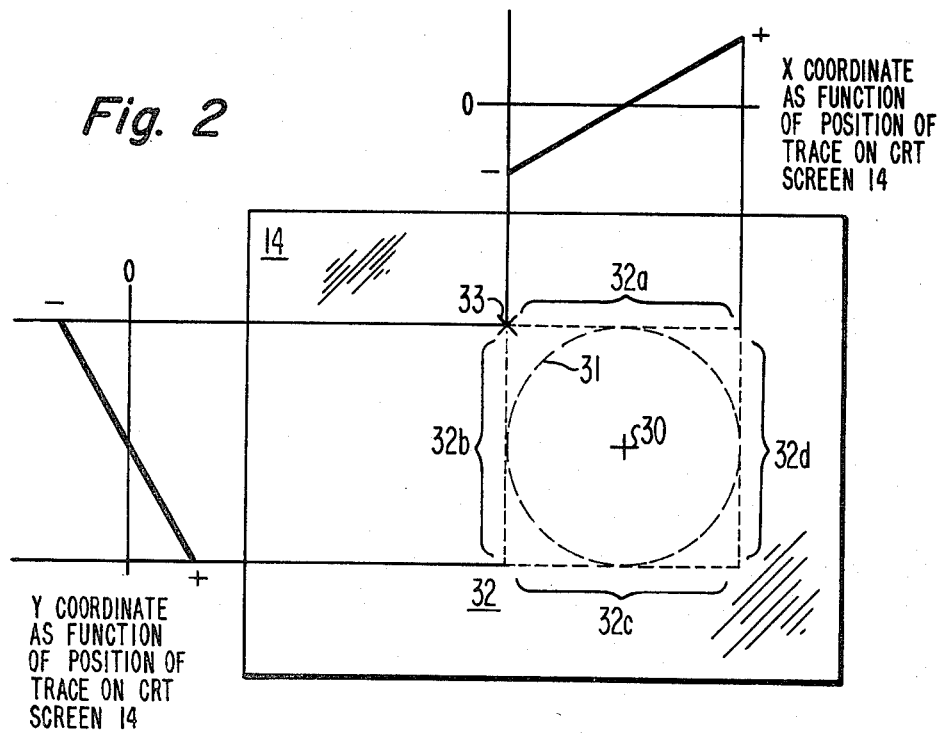
FIG. 2 is a sketch useful in understanding the forms taken by the Cartesian coordinates describing the rotatable image prior to its rotation.

FIG. 2 is useful in understanding how to define the x and y coordinates of electron beam trace position to implement scan conversion. Point 30 is the arbitrarily chosen center of rotation for the image to be retrieved from memory 10. This center of rotation 30 is the center of a dashed-line circle 31 of arbitrary radius within the perimeter of which the image will always repose, whether rotated or not. It is convenient to choose this radius to be $2^n$ pixels, where n is an integer. Circle 31 is inscribed in a square 32 with sides 32a, 32b, 32c, and 32d which defines that portion of the raster-scan to be transformed from x, y coordinates to the r, $\theta$ coordinates used for addressing memory 10.

The scan conversion calculations are considerably simplified by choosing the center of rotation 30 as the origin for the x, y coordinate system. However, the point at which it is best to begin to carry forward the scan conversion process is the first point to be scanned in square 32—i.e. the upper left-hand corner 33, presuming the use of conventional CRT raster-scan with the relatively slow line-by-line scan from top to bottom in the trace direction and with the relatively fast pixel-by-pixel scan from left to right in the trace direction. This facilitates the changing of the rotation of the graphic image taken from memory 10 as it is presented on display screen 14 of CRT 13 without introducing disruption in the image as displayed. The rotation of the image as a Gestalt becomes possible simply by adding a different angle $\phi$ of programmable rotation to the angular coordinate developed by scan converter 21, performing this addition during times between successive raster scannings of the portion of image space occupied by the graphic image stored in memory 10. It is desirable to avoid insofar as possible straightforward digital multiplication in the scan conversion process, and the alternative of using some accumulation process processing at pixel-by-pixel rate in conversion of x and at line-by-line rate (where the display is not interlaced) in conversion of y may occur to the digital system designer.

Beginning scan conversion at other than the x, y origin poses a problem of how to establish the initial conditions for accumulation. In part, this problem arises in as much as the origin is the only point that is scan-converted without being affected by the angle $\phi$ through which the image is rotated. Another aspect of the problem is that the origin in both coordinate systems is remote from point 33, so at least one of its coordinates tends to have nearly maximum value. Usually accumulation processes are carried forward from zero, however, so that the large numbers are gradually accumulated, this tending towards simplifying the arithmetic to a single addition or so.

Figure 3:
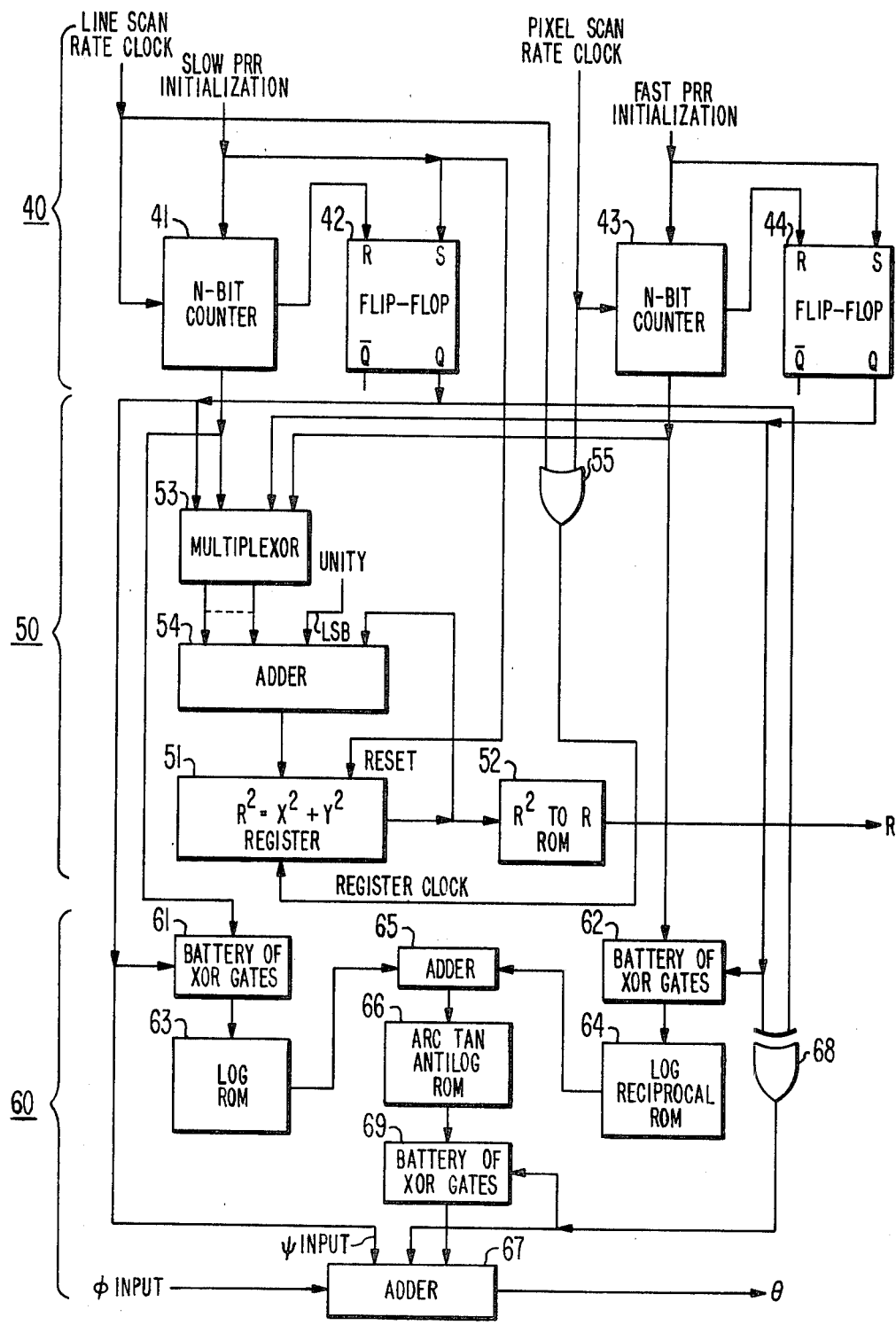
FIG. 3 is a block diagram of scan generator and scan converter circuitry used for addressing a memory storing information organized according to polar coordinates, which scan converter embodies the invention.

FIG. 3 shows a particular sub-raster scan generator 40 for generating x and y scan coordinates. The rest of the apparatus in the figure is a scan converter for converting these Cartesian coordinates to polar form for addressing memory 10 addressed in polar coordinates. E.g., memory 10 is addressed by column using the integral portions (int $\theta$) of the angular coordinate ($\theta$) and by row using the integral portions (int r) of the radial coordinate (r). It is convenient to have the scan generator generate x and y coordinates in two's complement form.

The y coordinate of scan is generated using an n-bit counter 41 and a set-reset flip-flop 42; their combined outputs provide the y coordinate in two's complement form, its most significant bit being provided by the Q output of flip-flop 42 and its less significant bits by counter 41 output. The output of counter 41 is reset to "ZERO" and the Q output of flip-flop 42 is set to "ONE" by a SLOW-PRR INITIALIZATION pulse generated in timing control circuitry 10 at the time when the raster-scanning of the display screen brings the electron beam trace to position 33 (described in connection with FIG. 2). ("PRR" is the abbreviation for "pulse repetition rate.") The count in counter 41 is incremented by a LINE-SCAN-RATE CLOCK pulse furnished to it by timing control circuitry 19 following each time the electron beam trace crosses side 32d of square 32 in FIG. 2, and occurring before the trace crosses side 32b on the ensuing line of display screen raster-scan. When the electron beam scan has crossed side 32d of square 32 on the electron-beam-trace scan line just prior to that which sweeps through center of rotation 30, the n-bit counter 41 will have counted $2^n$ scan lines and have reached full count of $2^n-1$. The next LINE-SCAN-RATE CLOCK pulse input will cause the counter 41 output to change from n parallel bits each being a ONE to n parallel bits each being a ZERO and to reset flip-flop 42. When being reset, flip-flop 42 toggles from a ONE to a ZERO at its Q output; and its Q output remains a "ZERO" for the remainder of the scanning of square 32.

The x coordinate of scan is generated using a n-bit counter 43 and a set-reset flip-flop 44; their combined outputs provide the x coordinate in two's complement form, its most significant bit being provided by the Q output of flip-flop 44 and its less significant bits, by counter 43 output. The output of counter 43 is reset to a ZERO and the Q output of flip-flop 44 is set to a ONE by a FAST-PRR INITIALIZATION pulse generated by timing control circuitry 19 at the time when the raster-scanning of the display screen brings the electron beam to any point on side 32d of square 32 (described in connection with FIG. 2). The count in counter 43 is incremented at video rate by a PIXEL-SCAN-RATE CLOCK pulse furnished from timing control circuitry 19. When the electron beam has reached a distance from side 32b one pixel shorter than that center of rotation 30 is from side 32b, the n bit counter 43 will have counter $2^n$ pixels and have reached full count of $2^n-1$. The next PIXEL-SCAN-RATE CLOCK pulse input will cause the counter 43 output to change from n parallel bits each being a ONE to n parallel bits each being a ZERO and to set flip flop 44 with its overflow bit. The Q output from flip flop 44 toggles from a ONE to a ZERO and remains a ZERO for the remainder of the scan to side 32d of square 32.

The types of circuitry that can be used in timing control circuitry 19 for generating the LINE-SCAN-RATE CLOCK, SLOW-PRR INITIALIZATION, PIXEL-SCAN-RATE CLOCK and FAST-PRR INITIALIZATION pulses are familiar to the video system designer. The PIXEL-SCAN-RATE CLOCK and LINE-SCAN-RATE CLOCK pulses are normally generated by frequency-dividing counters which count MASTER CLOCK pulses—although it is possible (particularly in systems with monochromatic display) that the master clock 20 supplies output pulses at pixel scan rate, which may be applied without frequency division to counter 43 as input for counting. The SLOW-PRR INITIALIZATION pulse may be generated using a counter to count electron-beam-trace scan lines since field retrace and then using a digital comparator to compare the output of that counter to a programmed line count for obtaining indications of when the edge 32a of square 32 has been reached by the electron beam trace; and the FAST RESET pulse may be generated using a counter to count pixels since line retrace and then using a digital comparator to compare the output of that counter to a programmed pixel count for obtaining indications of when the edge 32b of square 32 has been reached by the electron beam trace. These counters are normally extant in the frequency divider circuitry used in the generation of horizontal and vertical synchronizing pulses for the horizontal and vertical sweep generator 17, 18. In the special case where the perimeters of the display screen and of square 32 coincide, the SLOW-PRR and FAST-PRR INITIALIZATION pulses may be provided by the vertical and horizontal synchronization pulses, respectively, with the PIXEL-SCAN-RATE CLOCK and LINE-SCAN-RATE CLOCK pulses being supplied as gated clocks, with clock pulses furnished only during trace and not during retrace. In this special case the counters used in the scan generator may also be employed in the counting used in frequency division of the master clock pulse repetition rate to control the timing of horizontal and vertical synchronization pulses for sweep generators 17 and 18.

In other cases, where the square 32 is entirely within the confines of the screen, gated clocks may be used where clock pulses are provided only so long as the electron beam trace is within square 32. Allowing square 32 to be only partially on screen will require measures to prevent the portion of the display that is supposed to be off-screen—i.e., beyond an edge of the screen—from appearing on screen extending from the opposite edge of screen. This blanking is most straightforwardly carried out by selectively enabling the reading of memory 19, depending on whether the evenness or oddness of the counts in counters 41 and 43 correspond or do not correspond to those of counts from the frequency-dividing counters in timing control circuitry 10, which are used to time horizontal and vertical synchronization pulses. While field interlace is not normally used in digitally generated graphic video displays, where it is used, the LINE-SCAN-RATE CLOCK to counter 41 can comprise pulse doublets, each doublet occurring once per line scan interval to cause counter 41 to increment by two each time it counts rather than by one. Provision is then also made to apply an additional LINE-SCAN-RATE CLOCK pulse to counter 41 every other interval between field scans, to compensate for the one less line in alternate fields.

Circuitry 50 converts the x and y coordinates to the radial coordinate r of the polar coordinates used for addressing memory 10 supposing it to be of a type addressed in polar coordinates. The following formula is a conventional basic conversion formula used in circuitry 50.

$$r^2 = x^2 + y^2 \tag{1}$$

By a process that will be explained presently $x^2+y^2$ is accumulated in a $(2n+1)$-bit register 51 to provide an $r^2$ input to a read-only memory (ROM) 52. ROM 52 stores a square-root look-up table and responds to $r^2$ to provide the radial coordinate r.

The accumulation of $x^2$ and $y^2$ is based on the following specific expression of the binomial theorem, where $z$ is the general expression for either variable, $x$ or $y$.

$$(z+1)^2 = z^2 + 2z + 1 \quad (2)$$

From this one can by the rules of ordinary algebra develop the following relationships.

$$(x+1)^2 + y^2 = (x^2 + y^2) + (2x+1) \quad (3)$$

$$x^2 + (y+1)^2 = (x^2 + y^2) + (2y+1) \quad (4)$$

The initial contents of $r^2 = x^2 + y^2$ register 51 should be twice $2^{2n}$ or $2^{(2n+1)}$—that is, the sum of $x^2 y^2$ associated with point 33. This is arranged by resetting the $(2n+1)$-bit register 51 output responsive to the SLOW-PRR INITIALIZATION pulse to all ZERO's, which represents an overflow count of $2^{(2n+1)}$.

Thereafter, the two's complement output of register 51 is clocked out and added to the two's complement output of a multiplexor 53 responsive to each REGISTER CLOCK pulse provided from the output of an OR gate 55 responsive to either a LINE-SCAN-RATE or PIXEL-SCAN-RATE CLOCK received at one of the inputs of gate 55; and the two's complement result is used to update the contents of register 51. Multiplexor 53 is arranged to select as its output, during times the register 51 is to be clocked with a REGISTER CLOCK pulse derived from a PIXEL-SCAN-RATE CLOCK pulse, its input corresponding to a $(2x+1)$ term. This term comprises n more significant bits each corresponding to the Q output bit of flip flop 44, n less significant bits corresponding to the n-bit output of counter 43, and a least significant bit which is invariably a ONE. Multiplexor 53 is arranged to select as its output, during times the register 51 is to be clocked with a REGISTER CLOCK pulse derived from a LINE-SCAN-RATE CLOCK pulse, its input corresponding to a $(2y+1)$ term. This term comprises n more significant bits each corresponding to the Q output bit of flip flop 42, n less significant bits corresponding to the n-bit output of counter 41, and a least significant bit which is invariably a ONE.

The n more significant bits of these two's complement terms being all ZERO's is indicative of their being positive. In such instances the n less significant bits correspond to the 2x portion of $(2x+1)$ and to the 2y portion of $(2y+1)$; and the least significant bits being ONE's add unity to 2x and 2y. The n more significant bits in these two's complement terms being all ONE's, on the other hand, is indicative of their being negative. In such instances the remaining bits correspond to the complement of $(2x+1)$ and to the complement of $(2y+1)$—i.e. those terms subtracted from $2^n$.

In the case where the perimeters of square 32 and the display coincide, the multiplexor 53 is controlled by pulses generated during horizontal retrace. Absent the pulses, counter 43 output is selected by multiplexor 53 as its output, otherwise counter 41 output is selected as its output. In other cases the multiplexor 53 can be controlled by the output of a flip-flop, set by alternate overflow bits from counter 43 to direct multiplexor 53 to select counter 41 output as its output, and reset by delayed LINE-SCAN-RATE CLOCK pulse to direct multiplexor 53 to select counter 43 output as its output.

Circuitry 60 converts the x and y coordinates to an unrotated image angular coordinate $\psi$ to which a programmable angle $\phi$ of image rotation is added to generate the rotated-image angular coordinate $\theta$ of the polar coordinates used for addressing memory 10, continuing to suppose it to be of a type addressed in polar coordinates. The most significant bit of $\psi$, indicative of the half-plane the sample point of the unrotated image lies in, is available directly from polarity-bit flip-flop 42 of scan generator 40. The second most significant bit of $\psi$, which together with the most significant bit of $\psi$ indicates the quadrant in which $\psi$ lies, is generated at the output of an exclusive OR gate 68 to which the outputs of flip flops 42 and 44 of scan generator 40 are applied. The less significant bits of $\psi$ are, in essence, to be generated as the arc tangent of $|y|/|x|$. The quotient of $|y|/|x|$ requires registers of extreme length to maintain sufficient accuracy in defining angles close to multiples of $\pi/2$, including zero and $\pi/2$, inasmuch as $|y|/|x|$ changes rapidly except around odd multiples of $\pi/4$. A comparison of the range of $|y|/|x|$ values can be achieved, and division can be facilitated, by carrying forward the division process using logarithms.

To generate a good approximation for larger values of $|y|$, the two's complement, with most significant bit suppressed, y output of counter 41 is applied as first inputs to a first battery 61 of exclusive OR gates each receiving the Q output of flip flop 42 as their second inputs. The outputs of the battery 61 of exclusive OR gates is the approximation of $|y|$ in ordinary binary numbers. The output from second battery 62 of exclusive OR gates provides a good approximation for larger values of $|x|$ analogously, in response to inputs taken from the output of counter 43 and the Q output of flip-flop 44. Where memory 10 stores information at locations with r coordinates close to the origin $r=0$, the Q outputs of flip-flops 42 and 44 can be added to the outputs of batteries 61 and 62 of exclusive OR gates to obtain $|y|$ and $|x|$ exactly.

A ROM 63 responds to the n-parallel-bit output of battery 61 of exclusive OR gates to supply its logarithm to the base two, and a ROM 64 responds to the n-parallel-bit output of battery 62 of exclusive OR gates to supply the logarithm to the base two of its reciprocal. These logarithms are summed in adder 65 to develop the logarithm of $|y|/|x|$, applied as input to a ROM 66. ROM 66 supplies the arc tangent of the antilogarithm of its input to generate $\psi = \tan^{-1}(|y|/|x|)$ or its complement, depending on the display quadrant. A battery 69 of exclusive-OR gates responds to the quadrant indication from exclusive-OR gate 68 applied to their first inputs and to ROM 66 output applied to their second inputs to provide the polar coordinate $\psi$ of the unrotated image. $\psi$ is summed in adder 67 with the angle $\phi$ through which the image is to be rotated. This addition generates $\theta$, the polar coordinate the integral portion of which is to be used in addressing memory 10, supposing its storage locations to contain the display image information in polar-coordinate organization.

ROM's 63 and 64 have been constructed using two component ROM's of the conventional size with eleven-bit inputs and eight-bit outputs, responding to the nine bits of x and y respectively to provide sixteen-bit logarithms. Rom 66 has been constructed using four component ROM's of this size to respond to the twelve most significant bits of adder 65 output to provide $\psi$ with sixteen bits resolution. So eight component ROM's of this size in addition to simple adder 65, suffice for calculation $\theta$ with sixteen-bit resolution, rather than sixty four ROM's of this size being needed as would be the case with table loop-up of $\psi$ directly from x and y.

Figure 4:
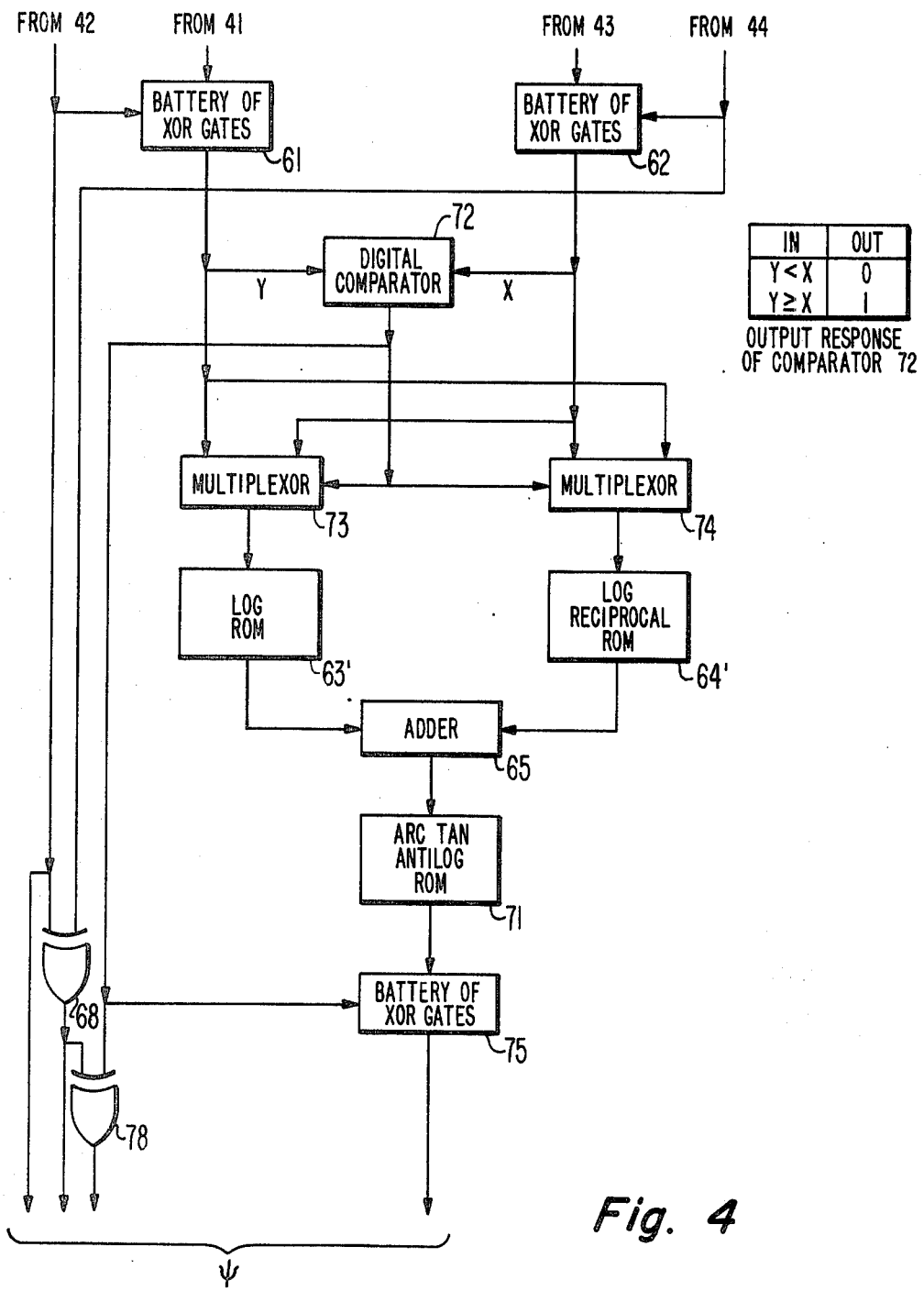
FIG. 4 is a block diagram of a modification that can be made to the FIG. 3 scan converter.

FIG. 4 shows how ROM 66 can be replaced by a ROM 71 which stores $0 \leq \psi \leq (\pi/4)$ rather than $0 \leq \psi \leq (\pi/2)$ taking advantage of the following relationship for $0 \leq \psi \leq (\pi/2)$.

$$\tan ](\pi/2) - \psi] = = [\tan (\psi)]^{-1}$$

This halves the number of inputs to the ROM for arc tangent look-up.

Digital comparator 72 compares the n-parallel-bit output from battery 61 of exclusive OR gates to the n-parallel-bit output from battery 62 of exclusive OR gates to develop an output that is a ZERO for the former smaller than the latter and is otherwise a ONE. This output and the output of exclusive OR gate 68 are applied as inputs to a further exclusive OR gate 78. The output of gate 78 is used as the thirdmost significant bit of $\psi$ and so reduces by one the number of bits sotred at each location in ROM 71 to preserve the accuracy provided by ROM 66.

The output of comparator 72 also is applied as control signal to multiplexors 73 and 74 and as first input to each of a battery 75 of exclusive OR gates. These exclusive OR gates receive as second inputs respective bits of the output from ROM 71, reproducing those bits as their outputs when their first inputs are ZERO and complementing those bits as their outputs when their first input are ONE. The output of comparator 72 being a ZERO directs multiplexors 73 and 74 to apply the outputs of batteries 61 and 62 of exclusive OR gates to ROM's 63 and 64, respectively; and battery 75 of exclusive OR gates passes the ROM 71 output without complementing to furnish the less significant bits of $\psi$. The output of comparator 72 being a ONE directs multiplexors 73 and 74 to apply the outputs of batteries 61 and 62 of exclusive OR gates to ROM's 64 and 63, respectively; and battery 75 of exclusive OR gates complements the ROM 71 output in its output to furnish the less significant bits of $\psi$.

Variations of the circuit of FIGS. 3 or 4 are possible wherein ROM 64 or 64' is replaced by a ROM supplying the logarithm of y rather than the logarithm of its reciprocal, and wherein adder 65 is replaced by a subtractor circuit for linearly combining the output of ROM 63 or 63' with that of the ROM responsive to y. Still further variations are possible where the x and y outputs of multiplexors 73 or 74 are alternately used as inputs to the same ROM used as a logarithm look-up table, with a subtractor combining the alternately supplied ROM outputs to develop input for the ROM 66 or 71 used to look up the arc tangent of the antilogarithm of ($\log_2 y - \log_2 x$).

The r and $\theta$ coordinates generated by the scan conversion techniques described above each comprise an "integral" portion or "modulus"—i.e., the more significant bits of that coordinate which are used to address the memory—and a "fractional" portion or "residue"—i.e., the less significant bits of that coordinate which are not used to address the memory. While the residues frac r and frac $\theta$ of these coordinates could be simply disregarded, it has been found that using them to govern a two-dimensional interpolation between each four closely-grouped adjacent locations in memory can practically eradicate spatial quantization effects in the raster-scanned display. These undesirable effects, such as "staircasing" of slant lines, tend to arise because the sampled points of the stored image do not conformally map the centers of the display pixels.

The two-dimensional linear interpolation can be done by successively polling each of the four adjacent locations in memory for each pixel scanned in the display raster. Or the memory may be quadruplicated with the image shifted one coordinate step in one direction or the other or both in the three supplementary memories, with the four memories being read in parallel and their outputs summed for each pixel scanned in the display raster. The first of these alternatives involves high video rates of operation. The second of these alternatives requires a four times increase in memory size. It was observed that this increase in memory size is just to store replicated data with shifted addresses, which led to a search for a way to retrieve the four pieces of information for the two-dimensional linear interpolation in parallel from a memory not increased in size.

Figure 5:
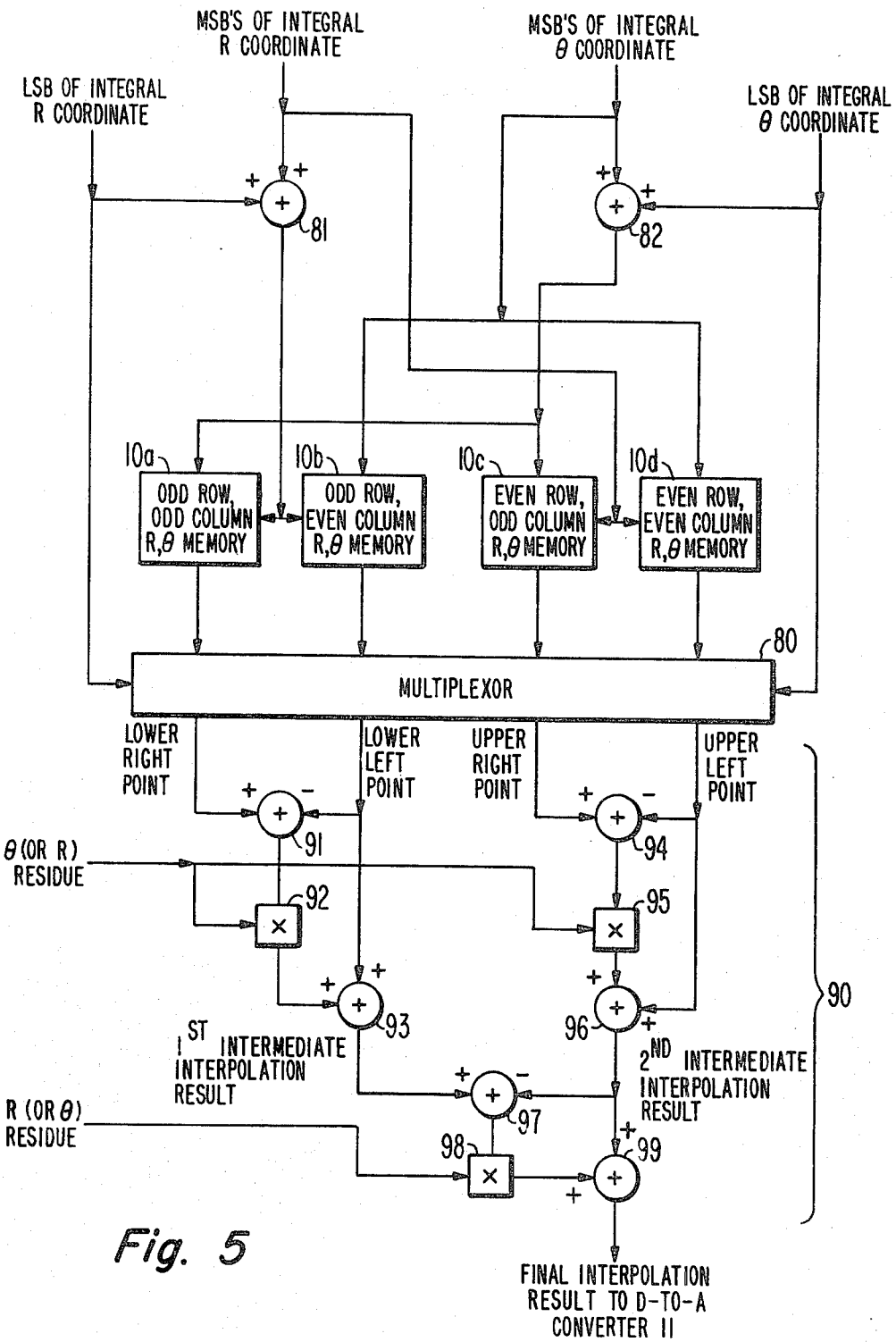
FIG. 5 is a block diagram of a memory system useful in connection with the FIG. 1 apparatus.

FIG. 5 shows the result of that search. Memory 10 is subdivided into four portions 10a, 10b, 10c, and 10d. These portions are read out in parallel via a multiplexer 80 to simultaneously supply four bits of information in parallel to the two-dimensional linear interpolation circuitry 90. The least significant bits of the integral portions int r and int $\theta$ of r and $\theta$ control the multiplexer which accesses the memories depending on whether odd or even column address is at the left in the square arrangement of four adjacent locations in memory under consideration and on whether an odd or even row address is uppermost in the arrangement. For certain square arrangements such as those where the least significant bits of int r and of int $\theta$ are both a ZERO the submemories are addressed similarly in r and $\theta$.

For squares of four adjacent memory locations displaced one row downward, the lowermost row should be at a row address one higher than the uppermost row. This is taken care of by row-addressing submemories 10a and 10b with the output of adder 80, which adds the least significant bit of the integral portion of the r coordinate to the more significant bits of the integral portion of the r coordinate used directly to row-address submemories 10c and 10d.

For squares of four adjacent memory locations displaced one column to the right the rightmost column should be at a column address one higher than the leftmost column. This is taken care of by column-addressing submemories 10a and 10c with the output of adder 82, which adds the least significant bit of the integral portion of the $\theta$ coordinate to the most significant bits of the integral portion of the $\theta$ coordinate used directly to column-address submemories 10b and 10d.

As each pixel is raster-scanned the four adjacent locations in memory addressed at that time supply upper left, upper right, lower left, and lower right information for two-dimensional linear interpolation in interpolator circuitry 90. This interpolation can be carried out as shown in FIG. 5, for example. The lower-left point trace intensity information is subtracted from the lower-right trace intensity information in combining circuit 91; the difference is multiplied in digital multiplier 92 by the fractional residue of the appropriate coordinate and added back to the lower-left trace intensity information in combining circuit 93 to obtain a first intermediate interpolation result. The upper-right and upper-left trace-intensity information are combined analogously to the lower-right and lower-left trace-intensity information using combining circuit 94, digital multiplexer 95, and combining circuity 96, to supply a second intermediate interpolation result from the output of combining circuit 96. This second intermediate interpolation result is subtracted from the first in combining circuit 97; and the resulting difference is multiplied in digital multiplier 98 by the residue of the other coordinate and added back to the second intermediate interpolation result in combining circuit 99 to obtain the final interpolation result supplied as input to digital-to-analog converter 11.

One skilled in the art of digital system design and armed with the foregoing disclosure will be enabled to design many other embodiments of the invention specified in the broader of the claims which follow this specification, and the scope of the invention defined by these claims should be accordingly broadly construed. For example, where there is no desire to carry forward calculations in the logarithmic domain prior to table look-up of a monotonically non-linear function of a first variable from ROM, it may be desirable to develop a second, dependent variable for addressing the ROM by calculation, as a root or power of the first variable. Or, as a further example, the second variable may be $\log_2^k$ of the first variable, where k is a constant. As a still further example, certain non-monotonically non-linear functions of a first variable may be taken as output from ROM responsive to second variable input, which second variable is a polynominal expression of powers of the first variable.

What is claimed is:

1. Scan conversion apparatus comprising: means for parallelly supplying streams of first and second binary numbers descriptive of raster scanning in first and second orthogonal Cartesian coordinates, the first coordinates describing pixel positions along scan lines and the second coordinates describing scan line positions in the field of raster scan;
    means for generating pairs of logarithms, each logarithm in a pair being generated responsive to a respective one of the first and second binary numbers appearing in said parallely supplied streams at successive times;
    means linearly combining the logarithms in each of said pairs of logarithms as they are generated, for generating the difference of the logarithms of concurrently supplied first and second binary numbers; and
    first read-only memory means responsive to said differences for supplying binary numbers descriptive of raster scan in terms of angular position from a reference position in said raster scan.

2. Scan conversion apparatus as set forth in claim 1 further including:
    means for supplying binary numbers programmably offset from the binary numbers supplied by said first read-only memory means.

3. Scan conversion apparatus as set forth in claim 1 wherein said means for parallelly supplying streams of first and second binary numbers is of a type supplying them in two's complement form; wherein said means for linearly combining pairs of logarithms consists of a digital adder; and wherein said means for generating pairs of logarithms comprises:
    means for selectively complementing the less significant bits of said first binary numbers in two's complement form responsive to their respective most significant bits being ONE's and forwarding them without complementing responsive to their respective most significant bits being ZERO's;
    second read only memory means, responsive to the output from this means for selectively complementing and forwarding without complementing, for supplying the logarithm of the reciprocal of this output as input to said digital adder;
    means for selectively complementing the less significant bits of said second binary numbers in two's complement form responsive to their respective most significant bits being ONE's and forwarding them without complementing responsive to their respective most significant bits being ZERO's; and
    third read-only memory means, responsive to the output from this means for selectively complementing and forwarding without complementing, for supplying the logarithm of this output as input to said digital adder.

4. In combination:
    a memory for storing data addressed in first and second coordinates, which second coordinates are angular coordinates;
    raster generator means for generating a description of raster scan in x and y Cartesian coordinates;
    scan conversion means for converting said description of raster scan in x and y Cartesian coordinates to a description of raster scan in said first and second coordinates, which description in said first and second coordinates is used to address said memory for storing data, thereby to raster scan the data stored in said memory;
    means, included in said scan conversion means, for supplying from read-only memory respective logarithmic responses to said x and y Cartesian coordinates applied as input addresses;
    means, included in said scan conversion means, for linearly combining those logarithmic responses to obtain logarithms descriptive of one of said x and y Cartesian coordinates divided by the other;
    means included in said scan conversion means, for supplying from further read-only memory said angular coordinates as the arc tangents of the antilogarithms of said logarithms descriptive of one of said x and y Cartesian coordinates divided by the other, which logarithms are applied as input addresses to said further read-only memory; and
    means, included in said scan conversion means, for determining said second coordinates from said arc tangents.

5. A combination as set forth in claim 4 wherein said memory for storing data stores television image data, said combination being included in a television display system together with:
    a display device having a horizontal deflection system, having a vertical deflection system and having a video drive input;
    a horizontal sweep generator generating horizontal deflection signals applied to said horizontal deflection system for causing horizontal deflection of trace on said display device, which deflection changes in proportion with said x coordinates of raster scan;
    a vertical sweep generator generating vertical deflection signals applied to said vertical deflection system for causing vertical deflection of trace on said display device, which deflection changes in proportion with said y coordinates of raster scan; and
    means, responsive to output from said memory for storing data, for generating video drive signal applied to the video drive input of said display device over at least a portion of a display.

6. In combination:

a memory for storing data addressed in angular coordinates and in coordinates orthogonal to said angular coordinates;

raster generator means for generating a description of raster scan in a two's complement x coordinate and a two's complement y coordinate;

means responsive to said x and y coordinates for generating said coordinates orthogonal to said angular coordinates, which are applied to said memory for storing data for addressing that memory in coordinates orthogonal to said angular coordinates;

means for exclusive-ORing the most significant or sign bit of said x coordinate with each of its other bits, and means for obtaining logarithms of the signal samples thus generated;

means for exlusive-ORing the most significant or sign bit of said y coordinate with each of its other bits, and means for obtaining logarithms of the reciprocal of the signal samples thus generated;

means for linearly combining the logarithms, and means for obtaining from table look-up memory the arc tangents of the anti-logarithms of the signal samples thus generated were x and y descriptive of one quadrant of the angular coordinates;

means for specifying said angular coordinates in two's complement form, including means responsive to the most significant bit of one of said x and y coordinates for determining the most significant bit of said angular coordinates absent rotation of the data read from said memory storing data, including means responsive to exclusive OR of the most significant bits of said x and y coordinates for determining the secondmost significant bit of said angular coordinates absent rotation of the data read from said memory for storing data, including means dependent on that secondmost significant bit for selectively complementing said arc tangents of anti-logarithms of signal samples to provide the bits of lesser significance in said angular coordinates absent rotation of the data read from said memory for storing data, and where the data read from said memory for storing data are to be rotated including means for offsetting the two's complement number thusfar formed by combination with another two's complement number indicative of the degree of data rotation, thereby to generate addresses in angular coordinates which are applied to said memory for storing data for completing the addressing of that memory.

7. A combination as set forth in claim 6 wherein said memory for storing data stores television image data, said combination being included in a television display system together with:

a display device having a horizontal deflection system, having a vertical deflection system and having a video drive input;

a horizontal sweep generator generating horizontal deflection signals applied to said horizontal deflection system for causing horizontal deflection of trace on said display device, which deflection changes in proportion with said x coordinates of raster scan;

a vertical sweep generator generating vertical deflection signals applied to said vertical deflection system for causing vertical deflection of trace on said display device, which deflection changes in proportion with said y coordinates of raster scan; and means, responsive to output from said memory for storing data, for generating video drive signal applied to the video drive input of said display device over at least a portion of a display.

8. In the combination of means for generating a description of a scanning point in Cartesian coordinates, one of said Cartesian coordinates being an x coordinate in two's complement form and the other being a y coordinate in two's complement form, and means for converting said Cartesian coordinates to angular coordinates, the improvement wherein said means for converting comprises:

means for calculating said angular coordinates from the logarithm of the magnitude of one of said x and y coordinates divided by the magnitude of the other;

means linearly combining logarithmic functions of said x and y coordinates for approximating the logarithm of one of said x and y coordinates divided by the other;

means for providing table look-up of logarithmic functions of said x and y coordinates responsive to first and second signals respectively, which means for providing avoids the problem of dividing by zero by including, in addition to read-only memory means for storing logarithm look-up tables, means exclusive-ORing the most significant bit of said x coordinate with each of its less significant bits to generate a first set of input signals for said read-only memory means, and means exclusive-ORing the most significant bit of said y coordinate with each of its less significant bits to generate a second set of input signals for said read-only memory means.

9. Apparatus for calculating a function of the angle between first and second orthogonal vectors, comprising:

means for generating a digital electric signal representation of the amplitude of said first vector;

means for generating a digital electric signal representation of the amplitude said second vector;

read-only memory receptive of said digital electric signal representation of the amplitude said first vector for responding with a digital electric signal representation of the logarithm of the amplitude of said first vector;

read-only-memory receptive of said digital electric signal representation of the amplitude of said second vector for responding with a digital electric signal representation of the logarithm of the reciprocal of the amplitude of said second vector;

an adder adding the digital electronic signal representations of the logarithm of the amplitude of the first vector and of the reciprocal of the amplitude of the second vecotor for developing a digital electric signal representation of the quotient of the amplitudes of said first and second vectors; and read-only memory receptive of the digital electric signal representation of the quotient of the amplitudes of said first and second vectors for supplying a digital electric signal representation of the associated value of the function of the angle between said first and second vectors.

10. Apparatus as set forth in claim 9 wherein said read-only memory receptive of the digital electric signal representation of the quotient of the amplitudes of said first and second vectors supplies digital electric signal representative of the angle itself between said first and second vectors.

* * * * *